US007835852B2

(12) United States Patent
Williams et al.

(10) Patent No.: US 7,835,852 B2
(45) Date of Patent: Nov. 16, 2010

(54) APPARATUS FOR DETECTING AND IDENTIFYING COMPONENT FAILURE IN A FUEL SYSTEM

(75) Inventors: Edward Williams, London (GB); Evrin Erdem, Hove (GB)

(73) Assignee: Delphi Technologies Holding S.arl, Troy, MI (US)

( * ) Notice: Subject to any disclaimer, the term of this patent is extended or adjusted under 35 U.S.C. 154(b) by 833 days.

(21) Appl. No.: 11/810,410

(22) Filed: Jun. 5, 2007

(65) Prior Publication Data

US 2008/0009987 A1 Jan. 10, 2008

(30) Foreign Application Priority Data

Jun. 16, 2006 (EP) .................................. 06253124

(51) Int. Cl.
*G06F 7/04* (2006.01)
*F02D 43/00* (2006.01)

(52) U.S. Cl. ...................................... 701/114; 123/478

(58) Field of Classification Search ................. 701/114, 701/102, 101, 115; 123/478, 480, 446, 447, 123/458

See application file for complete search history.

(56) References Cited

U.S. PATENT DOCUMENTS 4,404,943 A * 9/1983 Seilly ........................ 123/447
6,016,791 A * 1/2000 Thomas et al. ............. 123/497
6,076,504 A 6/2000 Stavnheim et al.
6,105,554 A * 8/2000 Nishiyama .................. 123/436
6,792,919 B2 * 9/2004 Kohketsu et al. ............ 123/447
2004/0035393 A1 2/2004 Ishiguro et al.
2004/0255908 A1 12/2004 Udd et al.

FOREIGN PATENT DOCUMENTS

| | | |
|---|---|---|
| DE | 19950222 | 4/2001 |
| EP | 1036923 | 9/2000 |
| WO | WO 01/83971 | 8/2001 |

OTHER PUBLICATIONS

EP Search Report issued Jan. 12, 2006.

* cited by examiner

*Primary Examiner*—Hieu T Vo
(74) *Attorney, Agent, or Firm*—Thomas N. Twomey

(57) ABSTRACT

A detector for detecting the operational status of one or more fuel pumps in a fuel system of a vehicle, the system comprising an accumulator volume for storing high pressure fuel, one or more injectors arranged in fluid communication with the accumulator volume and one or more high pressure fuel pumps arranged in fluid communication with the accumulator volume so as to supply high pressure fuel thereto, the operation of the one or more fuel pumps being controlled by a filling pulse signal from a control means, the detector comprising inputs for receiving data representing at least one current system parameter; processing means arranged to compare the at least one current system parameter against one or more predetermined system parameters in order to identify the operational status of the one or more fuel pumps.

34 Claims, 11 Drawing Sheets

APPARATUS FOR DETECTING AND IDENTIFYING COMPONENT FAILURE IN A FUEL SYSTEM

TECHNICAL FIELD

The present invention relates to an apparatus for detecting and identifying component failure in a fuel system. More particularly, although not exclusively, the invention relates to a method of detecting and identifying unit pump seizure of a common rail fuel supply system in a compression-ignition internal combustion engine. Also, the invention relates to a method for implementing the aforesaid apparatus.

BACKGROUND ART

Fuel injection systems based on common rail technology provide important advantages to engine and vehicle manufacturers who are under continual pressure by environmental regulatory bodies to reduce the pollution caused by the engine whilst improving the performance of the vehicle offered to the end user.

Principally, common rail technology enables the amount of fuel delivered to the combustion cylinders of the engine to be controlled precisely whilst providing high pressure injection and flexible injection timing. Important advantages are thus gained in terms of fuel economy and emissions. However, in order to operate efficiently, it is important that the pressure of fuel within the common rail is controlled accurately to a desired pressure level despite any disturbances that may be caused to the system.

In use, the relationship between the fuel pressure within the common rail (hereafter 'rail pressure') in response to the amount of fuel pumped into the common rail by a high pressure supply pump is that of a dynamic system. Typically, therefore, the high pressure fuel pump is controlled by a combination of open-loop and closed-loop control in order to fulfil the functional requirements of i) maintaining the desired rail pressure during changes of injection quantity, ii) varying the rail pressure in response to a change in pressure demand quickly and accurately, and iii) being resilient to system disturbances such as changes in fuel viscosity due to variations in temperature and fuel grade.

A typical fuel system comprises an accumulator volume in the form of a common rail which supplies fuel under high pressure to a plurality of fuel injectors. Fuel is supplied to the common rail from a high pressure rail supply pump, in the form of a number of unit pumps. Each unit pump comprises a pumping chamber within which fuel is pressurised by a pumping plunger. The plunger is driven in a reciprocating motion by a cam arrangement. The unit pumps are supplied with relatively low pressure fuel from a transfer pump.

Seizure of any of the unit pumps will affect the performance of the fuel system and consequently will affect the performance of the vehicle. Following seizure of a unit pump an engine may need to be shut down or run in a reduced mode of operation to prevent damage occurring to engine components. It is therefore highly desirable to be able to detect the seizure of a unit pump, e.g. because the pumping plunger has seized.

Known systems of detecting anomalous engine behaviour (e.g. U.S. Pat. No. 6,076,504 or EP1036923) operate by detecting a deviation from normal engine behaviour. Such systems represent fairly basic methods of detecting anomalous behaviour and generally only return an indication that there is some type of atypical engine condition. Specific information relating to the type of failure is not detectable under such systems.

It is therefore an object of the present invention to provide a detection apparatus for detecting anomalous behaviour within the fuel system.

SUMMARY OF THE INVENTION

According to a first aspect the present invention provides a detector for detecting the operational status of one or more fuel pumps in a fuel system of a vehicle, the system comprising an accumulator volume for storing high pressure fuel, one or more injectors arranged in fluid communication with the accumulator volume and one or more high pressure fuel pumps arranged in fluid communication with the accumulator volume so as to supply high pressure fuel thereto, the operation of the one or more fuel pumps being controlled by a filling pulse signal from a control means, the detector comprising: inputs for receiving data representing at least one current system parameter; processing means arranged to compare the at least one current system parameter against one or more predetermined system parameters in order to identify the operational status of the one or more fuel pumps.

A fuel system, for example the fuel system within an internal combustion engine, comprises a number of fuel injectors that are supplied with fuel from an accumulator volume, often referred to as a "common rail". This fuel is supplied to the injectors at high pressure.

The accumulator volume is, in turn, supplied with high pressure fuel from a number of high pressure unit pumps. The number of unit pumps may equal the number of fuel injectors, though this may not necessarily be the case. The operation of these unit pumps will be controlled via a control means, the functionality of which often forms part of the engine control unit.

Seizure or failure of any of the unit pumps will affect engine performance. The present invention provides a detector for detecting the status of the unit pumps. The detector comprises input means for receiving data relating to the current operating conditions within the engine. This data may relate to one or more current system parameters.

The detector further comprises processing means for analysing the received data. The processing means comprises data relating to one or more predetermined system parameters for use in comparing with the measured current system parameter(s). By comparing the current system data with the predetermined system information the processing means can determine the operational status of the unit pumps.

In the context of the present invention the predetermined system parameter relates to a system parameter that is indicative of a failed system. For example, in the event of a failure of an engine component within the engine, mechanical characteristics relating to the failed part may manifest themselves in measured current system parameters (e.g. the measured pressure within the engine system may exhibit pressure variations that are related to and identifiable with the failed component).

In this way it is noted that the present invention essentially is analysing the fuel system of the vehicle for a characteristic/parameter that is related to a failed part or component rather than looking for a deviation from nominally normal engine operating conditions.

As explained in further detail below, by looking for the presence of a parameter that is related to a failed system the detector of the present invention is capable of more discriminating failure detection than prior art systems.

In the event of a failure in one of the unit pumps there are a number of potential outcomes. The control means may be unable to deliver a filling pulse signal that can compensate for the failed pump. In this case, the filling pulse may saturate. Alternatively, the control means may be able to deliver a filling pulse signal that fully compensates for the failed pump. In such a case however the filling pulse signal will deviate from the signal that would normally be sent to the unit pumps. As a further alternative, the control means may not be able to fully compensate for the failed pump but will not saturate either.

Detection of the pump failure may therefore conveniently be detected by monitoring either the pressure within the accumulator volume and/or the filling pulse signal that is output by the control means.

Conveniently, therefore, the data received by the inputs can be the pressure within the accumulator volume. Alternatively, the data received may be the filling pulse signal as determined by the control means that is sent to the unit pumps. Still further, the detector may receive data relating both to the pressure within the accumulator volume and also the data relating to the filling pulse signal.

The high pressure pumps will generally comprise a pumping chamber within which the fuel is pressurised by a plunger. The plunger will usually be in communication with a cam arrangement. As the cam rotates a drive motion will be imparted to the plunger of a given unit pump. The reciprocating motion that is imparted to the plunger will reflect the shape of the cam arrangement. If the position of the plunger is plotted over time (or alternatively over engine crank angle) the drive profile of the cam arrangement will become apparent.

In the event that a plunger seizes it is expected that the drive profile of the cam arrangement will manifest itself either in variations in the accumulator pressure or in the filling pulse signal that is sent to the plungers from the control means. In other words, the predetermined system parameter (the drive profile of the cam arrangement) will be superposed on the measured current system parameter (the filling pulse signal or the measured accumulator pressure).

Conveniently, therefore, the processing means compares the at least one current system parameter with the drive motion of the cam arrangement. The presence of the drive motion superposed onto the current system parameter indicates a failure (or reduction in the operational status) of one of the unit pumps.

In a fuel system comprising more than one unit pump, the motion of the pumps will be phased with respect to one another. Conveniently therefore the processing means may compare the at least one current system parameter with the drive motion as applied to each pump within the fuel system. The superposition of the drive motion will be correlated with the phased drive motion which will therefore allow the processing means to determine the operational status of each of the unit pumps.

The comparison of the system parameters that is carried out by the processing means may conveniently be with respect to time. However, the comparison may also be carried out with respect to engine crank angle. If the processing is performed with respect to time then the data will be affected by changes in the engine operating conditions. If the processing is performed with respect to engine angle then the data processing requirements may be reduced.

There are a number of options for the data comparison that is performed within the processing means.

The processing means may comprise a pattern recognition algorithm which can be used to compare the current system parameter(s) with the predetermined system parameter. This may comprise a curve fitting function.

Alternatively, the processing means may fast Fourier transform the data received and compare the transformed components with the predetermined system parameters. Such a Fourier transform may be made with respect to time or alternatively with respect to a synthetic variable such as engine crank angle.

Conveniently, the Fourier transformed data comprises frequency content and phase information. The frequency content information and elements of the phase information may be used to determine if a fault is present in the fuel system. The phase information of a fundamental frequency within the frequency content information may then conveniently be used to determine where the fault is located.

In cases where the detector is analysing the current system parameters for the presence of the cam profile, the processing means conveniently compares the transform components of the at least one current system parameter with transform components of the drive motion imparted by the cam drive arrangement to the plunger.

Conveniently, therefore the processing means may be arranged to perform the following steps in order to determine which pump has seized:

(i) measure a current system parameter and obtain a Fourier transform of the measured current system parameter, the Fourier transform comprising frequency content and phase information of the measured current system parameter;

(ii) compare the Fourier transform of the measured current system parameter with predetermined Fourier transform information relating to the drive motion of the cam arrangement at each fuel pump, the predetermined Fourier transform information comprising frequency content information of the drive motion of the cam arrangement and phase information corresponding to the frequency content information (iii) determine if a pump has seized in the event that the current system parameter frequency content information matches or substantially matches the predetermined Fourier transform frequency content information and the phase information of these current system frequencies, relative to the phase of the fundamental frequency, matches or substantially matches the predetermined Fourier transform phase content information;

(iv) determine which pump has seized by comparing the phase information of a fundamental frequency component within the frequency content information for the predetermined and current transform information.

The fuel/pump system is a delayed first order function having three specific parameters that define the characteristic response of the system to an input: a steady state gain value “K”; a time constant value “T”; and a lag time “L”. The seizure of one of the unit pumps will cause the transfer function of the system to change. In a further alternative therefore the processing means may monitor the current transfer function against the transfer function as predetermined under seized plunger operating conditions.

Conveniently, the detector further comprises storage means for storing data relating to the predetermined system parameters. Preferably, data for system parameters with respect to varying engine conditions is stored within the storage means.

Conveniently, the storage means comprises a look up table that stores data relating to the one or more predetermined system parameters with respect to different engine conditions.

Preferably, the detector further comprises an output means that is arranged to output a response signal as determined by the processing means. For example, if the processing means determines that a unit pump has seized then a notification signal may be output to indicator means thereby notifying a user of the system that there is a problem.

The invention extends to a vehicle comprising an internal combustion engine, an accumulator volume for storing high pressure fuel, one or more injectors arranged in fluid communication with the accumulator volume and one or more high pressure unit pumps arranged in fluid communication with the accumulator volume so as to supply high pressure fuel thereto, the operation of the one or more unit pumps being controlled by a filling pulse signal from a control means and a detector according to the first aspect of the invention.

Alternatively, the response signal may be in the form of an engine control signal to limit the speed of the vehicle (e.g. to limit the vehicle to a "limp-home" mode).

The invention additionally extends to a control unit for controlling a high pressure unit pump so as to control the volume of fuel that is supplied to an accumulator volume comprising a detector according to the first aspect of the invention.

The invention also extends to an engine control unit and to a fuel system.

The present invention may also be expressed as a method of detecting the operational status of one or more fuel pumps in a fuel system of a vehicle, the system comprising an accumulator volume for storing high pressure fuel, one or more injectors arranged in fluid communication with the accumulator volume and one or more high pressure fuel pumps arranged in fluid communication with the accumulator volume so as to supply high pressure fuel thereto, the operation of the one or more fuel pumps being controlled by a filling pulse signal from a control means, the method comprising: receiving data representing at least one current system parameter and comparing the at least one current system parameter against one or more predetermined system parameters in order to identify the operational status of the one or more fuel pumps.

It is noted that preferred features relating to the method of the present invention are described above in relation to the first aspect of the invention The invention may also be expressed as a data carrier comprising a computer program to implement the method of the present invention.

BRIEF DESCRIPTION OF THE DRAWINGS

In order that the invention may be more readily understood, reference will now be made, by way of example only, to the accompanying drawings in which.

DETAILED DESCRIPTION

It is noted that like numerals are used to denote like features throughout the Figures.

Figure 1:
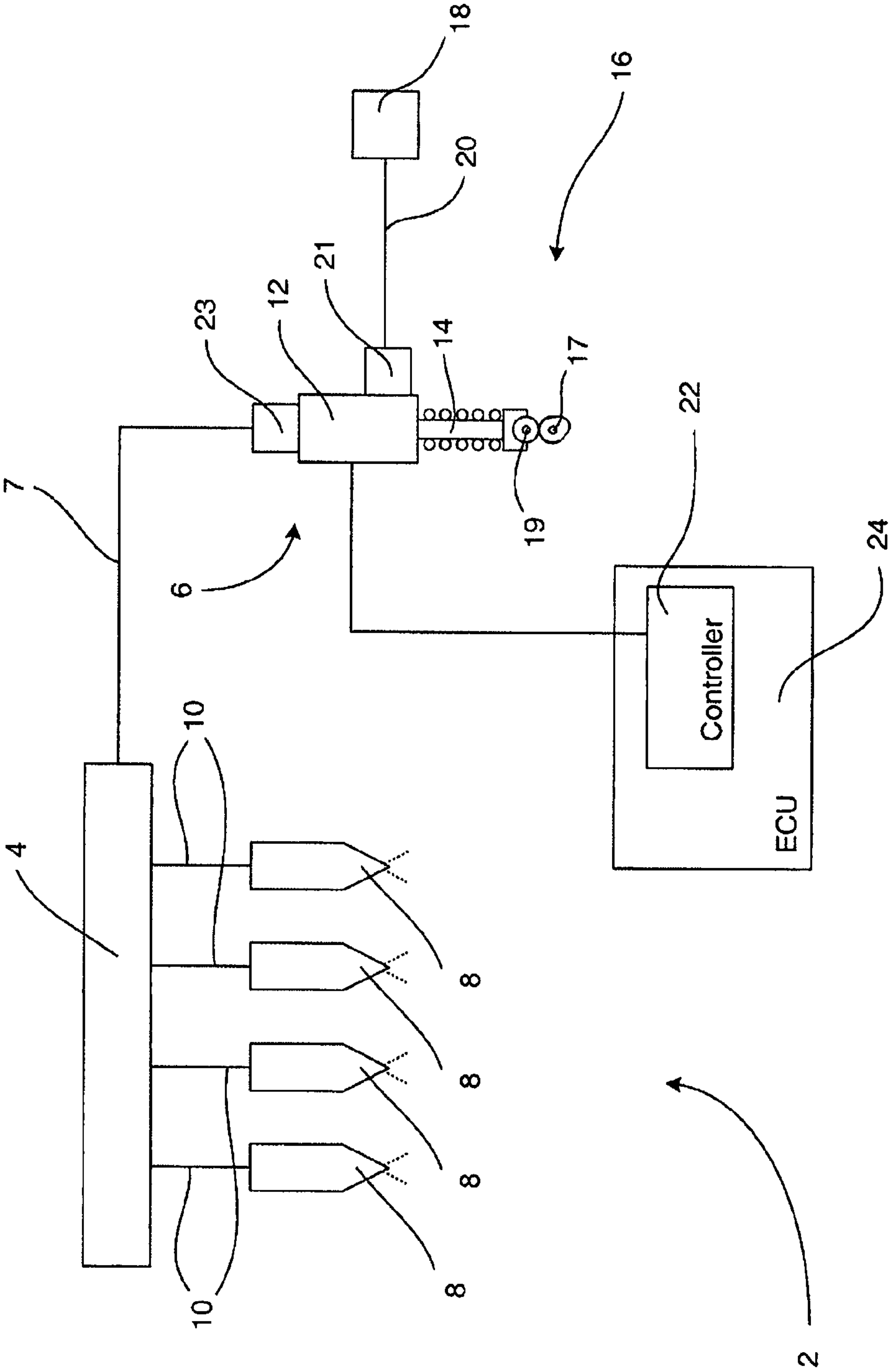
FIG. 1 is a schematic diagram of a fuel injection system to which the invention is applied.

FIG. 1 is a schematic diagram of a fuel injection system 2 that is simplified for the purpose of this specific description and within which the present invention may be incorporated. The fuel injection system 2 includes an accumulator volume in the form of a common rail 4 that is supplied with pressurised fuel from a high pressure rail supply pump, in the form of a unit-pump 6, via a high pressure fuel pipe 7. It should be noted that the unit-pump 6 is not shown in detail in FIG. 1 since it is not essential for understanding of the invention and the configuration of such a unit-pump 6 would be well known to the skilled reader. The common rail 4 is fluidly connected to four fuel injectors 8 by respective high pressure fuel supply pipes 10. The fuel injectors are controlled electronically to deliver fuel to an associated combustion cylinder of the engine (not shown).

The unit-pump 6 includes a pumping module 12 defining a pumping chamber (not shown) within which fuel is pressurised by an associated pumping plunger 14. The pumping plunger 14 is driven in a reciprocating motion to perform an inward, pumping stroke, and an outward, return stroke, by a cam-drive arrangement 16. In a known manner, the cam-drive arrangement 16 includes a driven cam shaft 17 having a cam surface that acts upon a roller/shoe arrangement 19 associated with the pumping plunger 14. Although only one unit-pump 6 is shown in FIG. 1 for simplicity, it should be noted that one or more of such pumps may be provided depending on the requirements of the engine installation.

The pumping chamber of the unit-pump 6 is supplied with relatively low pressure fuel from a transfer pump 18 via a low pressure supply pipe 20 and non-return valve 21. Low pressure fuel is therefore able to fill the pumping chamber when the pumping plunger 14 performs a return stroke ready for fuel pressurisation. As the cam-drive arrangement 16 drives the pumping plunger 14 on a pumping stroke, the pumping plunger 14 reduces the volume of the pumping chamber and so the fuel trapped therein is pressurised.

The pumping module 12 is provided with a rail control valve 23 which controls whether or not the pumping chamber communicates with the common rail 4 and thus controls the flow of pressurised fuel therefrom. In order to control the volume of fuel that is supplied to the common rail 4, control means in the form of a unit-pump controller 22 (hereinafter 'the controller') is provided, the functionality of which forms part of an engine control unit 24 (hereinafter 'the ECU'). The controller 22 is electrically connected to the unit-pump 6 and supplies electronic signals to the rail control valve 23.

In order to supply pressurised fuel to the common rail 4, the controller 22 causes the rail control valve 23 to transition from an open state to a closed state during the return stroke of the plunger thus breaking communication between the pumping chamber and the common rail 4. A relative vacuum will therefore be drawn in the pumping chamber which will cause the non-return valve 21 to open so as to permit fuel at transfer pressure to fill the pumping chamber. At the end of a plunger return stroke, the non-return valve 21 will close thus preventing fuel from flowing back to transfer pressure from the pumping chamber. At this point the rail control valve is opened. By controlling the point at which the rail control valve opens during the return stroke of the pumping plunger 14, the controller 22 determines the effective stoke of the pumping plunger 14 for which pressurised fuel is supplied to the common rail 4 from the unit-pump 6. The electronic signal necessary to control the rail control valve 23 is known as the 'filling pulse signal' and is measured as degrees of rotation of the engine crank shaft.

It is noted that the "filling pulse" is a value that is constantly calculated by the engine management system throughout each engine cycle. This value is utilised at certain points of the engine cycle (i.e. 6 times in a six cylinder four stroke engine cycle) to generate the filling pulse signal.

During operation of the fuel injection system, it is important that the pressure of fuel within the common rail 4 remains as close as possible to a specific demanded rail pressure that is set by the ECU 24. To achieve this, the controller 22 utilises negative feedback control to modulate the filling pulse appropriately so as to ensure the actual rail pressure equals the demanded rail pressure despite disturbances that may affect the system. The process by which the controller 22 maintains the fuel pressure within the common rail 4 at the demanded rail pressure will now be described with reference to FIG. 2.

Figure 2:
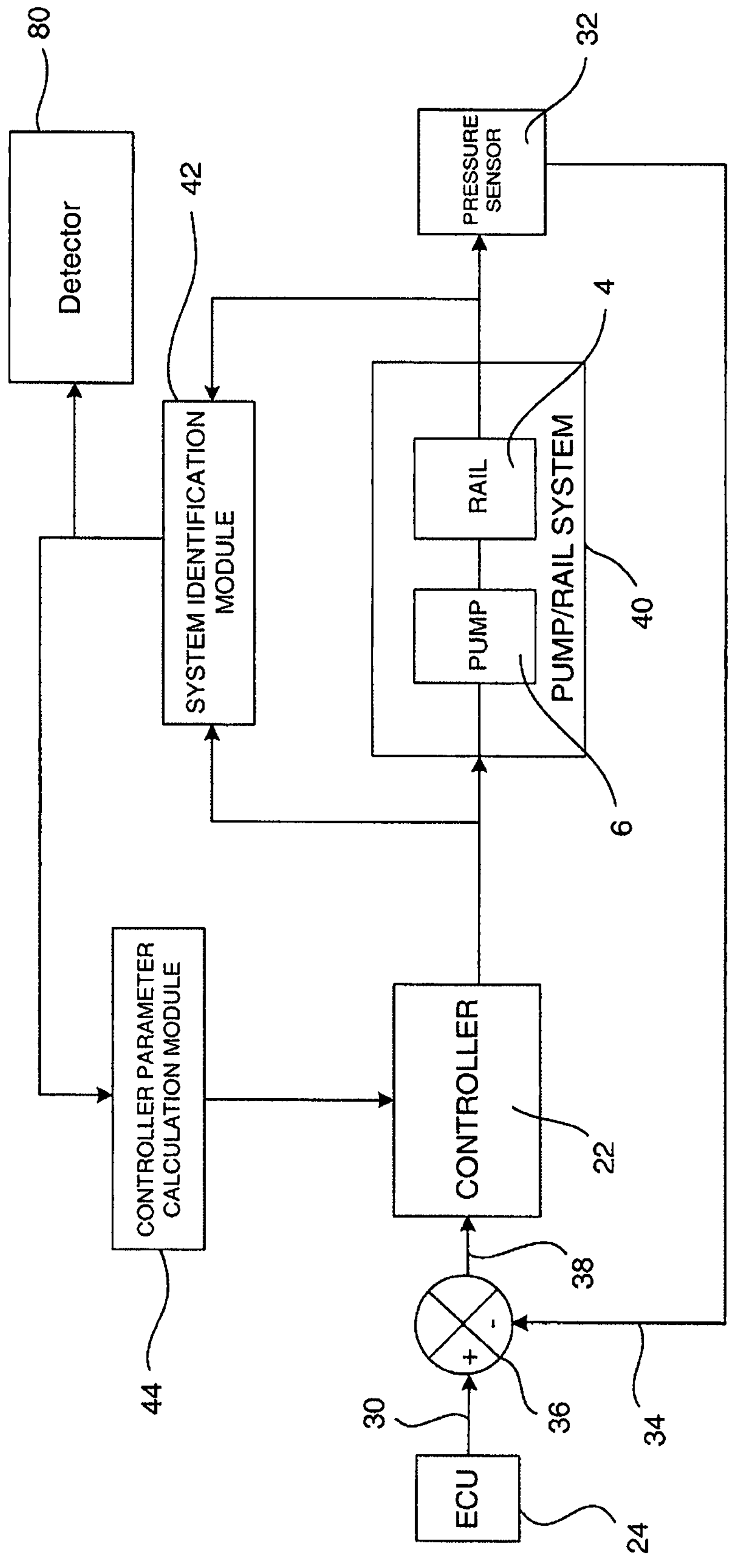
FIG. 2 is a functional block diagram of the fuel system in FIG. 1 and an associated rail pressure control system.

In FIG. 2, the ECU 24 outputs a rail pressure demand signal 30, that is determined based upon the prevailing operating conditions of the engine, to the controller 22 via a summing junction 36. For example, the ECU 24 will output a comparatively high rail pressure demand signal 30 when the engine is operating under a high engine load/speed condition as compared to a relatively low rail pressure demand signal 30 when the engine is at an idle operating condition.

A pressure sensor 32 mounted to the common rail 4 measures the actual pressure of fuel in the common rail 4 and outputs a feedback signal 34 that is subtracted from the rail pressure demand signal 30 at the summing junction 36. The output signal of the summing junction 36 is provided as an input to the controller 22 and represents the difference between the demanded common rail pressure and the actual common rail pressure. The output of the summing junction 36 shall hereinafter be referred to as 'the pressure error signal' 38. The function of the controller 22 is to calculate a filling pulse signal to control the rail control valve 23 of the unit-pump 6 so as to cause the pressure of fuel within the common rail 4 to substantially correspond to the demanded rail pressure, so that the pressure error signal 38 is substantially equal to zero.

It should be mentioned at this point that FIG. 2 represents a simplified system and that, in a practical embodiment, additional contributory filling pulse inputs will be sent to the unit-pump 6. Further filling pulse signal components would also be provided, for example via open loop or feed forward control functions, to compensate for fuel system losses such as the amount of fuel that is currently being injected. Compensation may also be provided for general fuel leakage from the system.

Figures 3A, 3B:
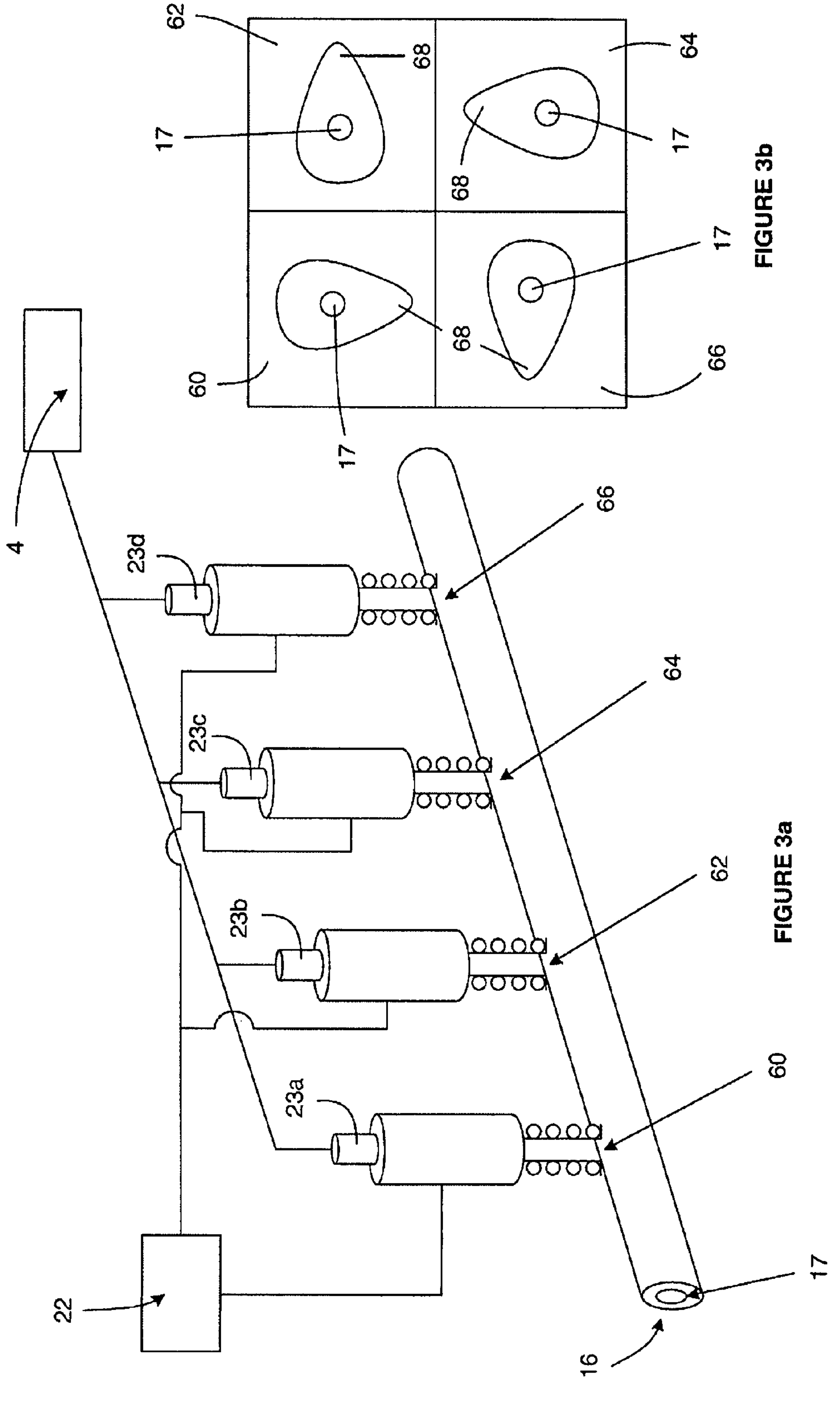
FIG. 3*a* is a schematic diagram of part of the system shown in FIG. 1 depicting four unit pumps.
FIG. 3*b* is a schematic of the cam arrangement of FIG. 3*a;*

As noted in relation to FIG. 1 above, there may be more than one unit pump within the fuel system. For example the fuel system of FIG. 1 may comprise one unit pump per fuel injector 8. FIG. 3*a* shows part of such an arrangement and it is noted that like numerals have been used to denote like features between FIGS. 1, 2 and 3*a*. FIG. 3*a* shows four unit pumps 6*a*, 6*b*, 6*c* and 6*d* which are in communication with an extended cam-drive arrangement 16 at locations 60, 62, 64 and 66 respectively.

Each unit pump is in communication with the controller 22 which supplies electronic control signals to the control valves 23*a*, 23*b*, 23*c* and 23*d*.

It is noted that the profile of the "filling pulse" that is supplied to each control valve during normal operation will be the same. There will, however, be differences in the phasing of the filling pulse from one unit pump to another.

The movement of the plungers of the unit pumps is determined by the shape of the cam arrangement. If the cam is shaped such that it has a particular varying profile along its length then, for periods during which the injectors are not injecting and the control valves 23*a-d* are open, the volume of the fuel system (i.e. the volume of the system as defined by the pumping chambers of the unit pumps, the high pressure fuel line 7, the rail 4 and the injectors 8) may be arranged to be constant.

The volume of the fuel system during such periods of normal operation may conveniently be kept constant by ensuring that while some plungers are moving upwards, others are moving downwards.

FIG. 3*b* shows the cam profile at the positions (60, 62, 64 and 66) indicated in FIG. 3*a*. It can be seen that the cam is eccentrically shaped and the position of the lobe 68 at any given moment varies depending on the location along the length of the cam.

It is noted that the cam profile depicted in FIG. 3*b* is by way of example only and that the invention encompasses any general cam shape.

The volume of the fuel system in the cam arrangement shown in FIG. 3*b* will not in practice remain at a constant volume. However, by appropriately shaping the cam lobes the plungers may be arranged to move in a manner that keeps the volume of the fuel system constant. It is also noted by way of clarification that the cam arrangement shown in FIG. 3*b* does not correspond to the cam profile shown in FIGS. 5, 6 and 7 discussed below.

As noted above the filling pulse that is to be applied to the fuel system in order to regulate the rail pressure at the desired value is determined by the controller 22 which acts on the pressure error signal 38, the difference between the actual and the demanded value of rail pressure.

The controller will conveniently comprise a data store (or alternatively be associated with a data store) that contains a look up table which details the filling pulse that needs to be applied to the fuel system to maintain the rail pressure at the desired value. This fuel demand to filling pulse mapping will additionally take into account other factors such as engine speed, engine temperature and injected fuel value.

During steady state engine operation, the rail pressure will be constant which means that the filling pulse will also be constant.

Figure 4:
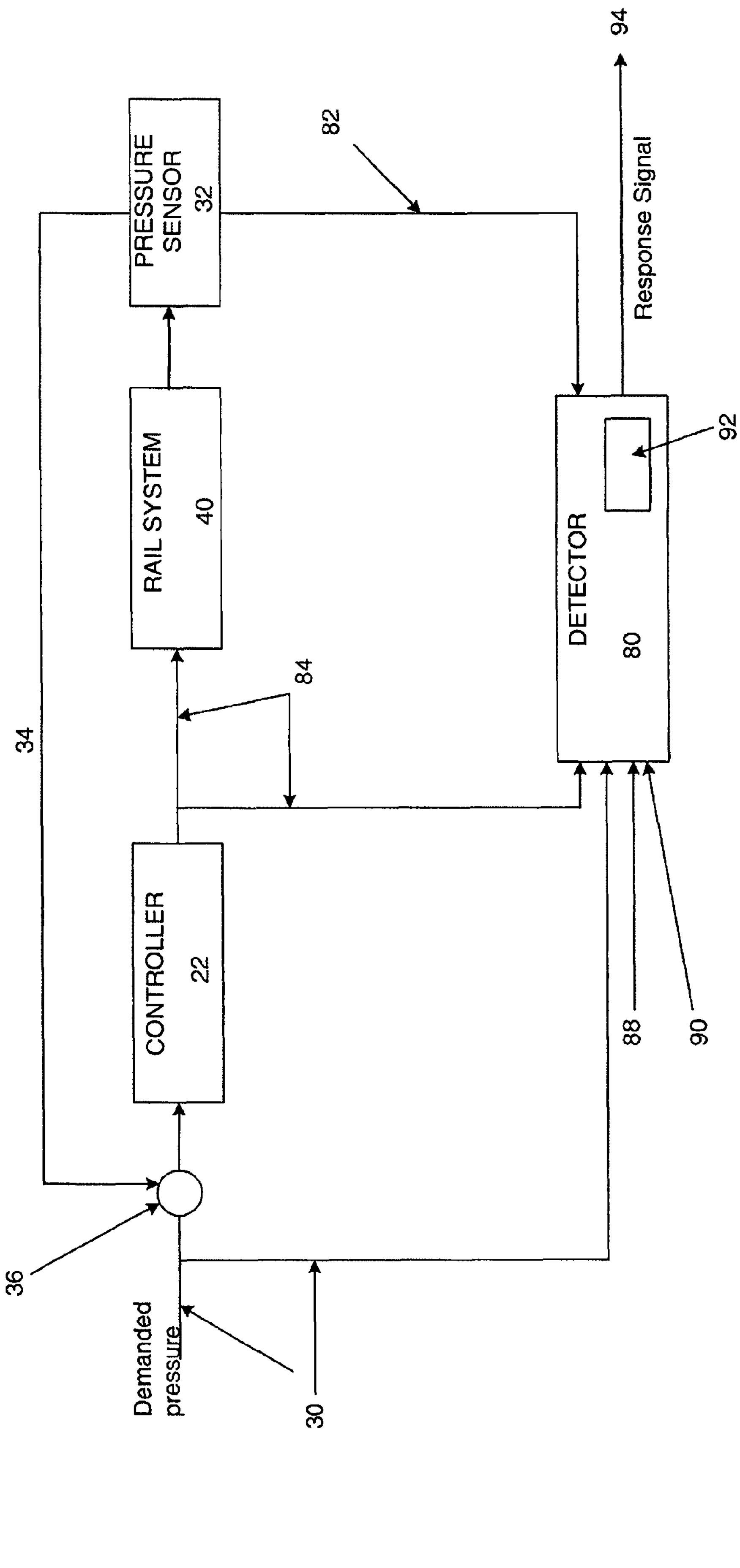
FIG. 4 is a diagram of a detector in accordance with an embodiment of the present invention.

FIG. 4 shows a detector according to an embodiment of the present invention and its relation to the fuel system of FIG. 2. Turning to FIG. 4, the controller 22, rail system 40 and rail pressure sensor 32 of FIG. 2 are shown.

The controller 22 and sensor 32 are additionally in communication with a detector 80 in accordance with an embodiment of the invention.

In use, the rail pressure sensor 32 measures the actual pressure of fuel within the common rail. As well as the feedback signal 34, the pressure reading is output in a further signal 82 to the detector 80.

As described above, the controller 22 outputs an electronic control signal to the pump/rail system 40 to control the rail control valve 23. This control signal, or filling pulse signal 84, is additionally provided as an input to the detector 80.

The demanded rail pressure 30 is output from the electronic control unit (not shown in FIG. 4) to the controller 22 and additionally to the detector 80. Further inputs to the detector include the engine speed 88 and the fuel temperature 90.

The detector 80 comprises a processor 92 running a seizure detection algorithm. The processor receives the various data inputs (82, 84, 30, 88, 90) and uses the seizure detection algorithm to determine whether any of the unit pumps (not shown in FIG. 4) within the rail system 40 have seized.

The detector 80 may output a response signal 94. This output signal 94 may take the form of a notification signal which is output to an indicator means (not shown) or alternatively may take the form of an engine control signal (which may, for example, be sent to the engine control unit).

During normal operation of the fuel system, the volume of the system between the pumps and the injectors will, for periods during which the injectors 8 are not injecting and the control valves 23*a-d* are open, be a constant. This is because the cam arrangement is shaped such that as some plungers are moving upwards, others are moving downwards to compensate (as a result of the special "constant volume" cam profile).

Figure 5:
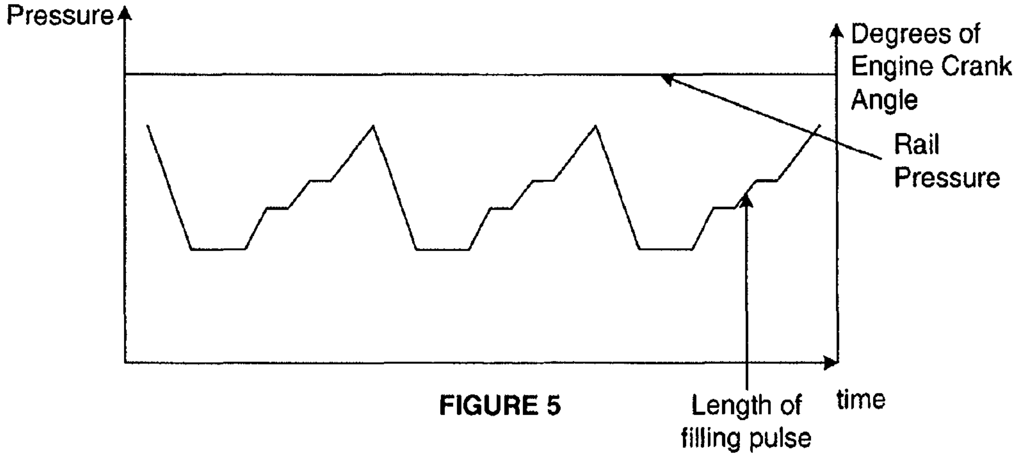
FIG. 5 is a graphical representation of rail pressure and filling pulse signal with respect to time following failure of a unit pump in the fuel injection system of FIG. 3*a;*

When an injector seizes, however, the volume of the system during these periods will no longer be a constant. In response to the seized unit pump the system will exhibit one of the following three types of behaviour:

1) In the first scenario, the controller 22 is able to fully compensate for the seized unit pump and to maintain the rail pressure at a constant level. In this case the filling pulse signal sent from the controller 22 to the fuel system 40 will be a mirror image of the cam profile. FIG. 5 shows a plot of rail pressure and filling pulse signal with respect to time in accordance with the data that is input into the detector 80 in this first scenario.

2) There is an upper limit on how large a filling pulse can be applied to the fuel system. This value is around 150 cam degrees (300 degrees of engine crank angle). When the calculated filling pulse reaches this value it is said to be "saturated".

The second type of behaviour therefore occurs when, in an effort to compensate for the seized unit pump, the controller reaches its maximum limit and the filling pulse saturates.

In this case, the fuel pressure within the accumulator volume will vary in accordance with the profile of the cam driving the remaining unit pumps. This case is regarded as the most likely to happen.

Figure 6:
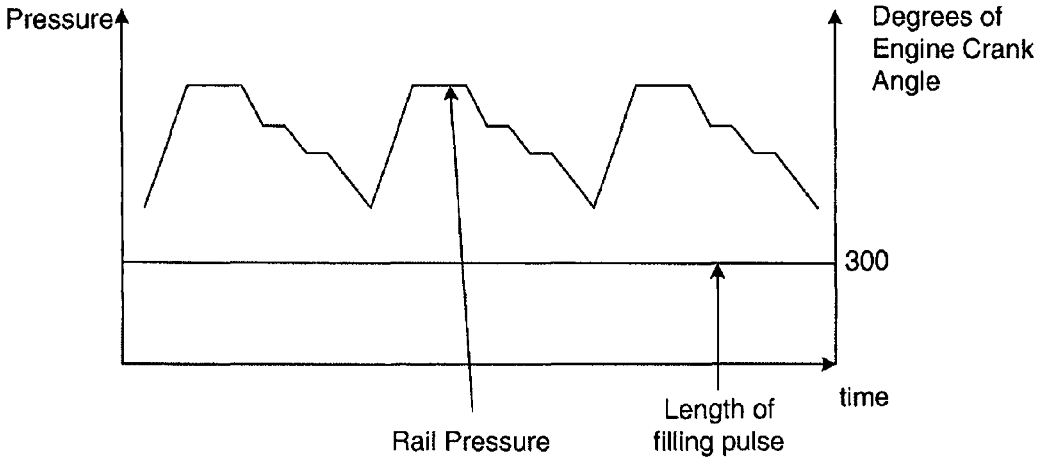
FIG. 6 is a further graphical representation of rail pressure and filling pulse signal with respect to time following failure of a unit pump in the fuel injection system of FIG. 3*a;*

FIG. 6 shows a plot of rail pressure and filling pulse against time as measured/input into the detector 80. The vertical axis on the left of the graph relates to the pressure in the accumulator volume and the vertical axis on the right of the graph relates to the filling pulse signal measured in angle of crank shaft rotation. As can be seen from the graph the filling pulse has saturated at 300 degrees of engine crank angle. The rail pressure trace has assumed the profile of the cam (which as can be seen from the figure is, in this case, a stepped cam arrangement).

Figure 7:
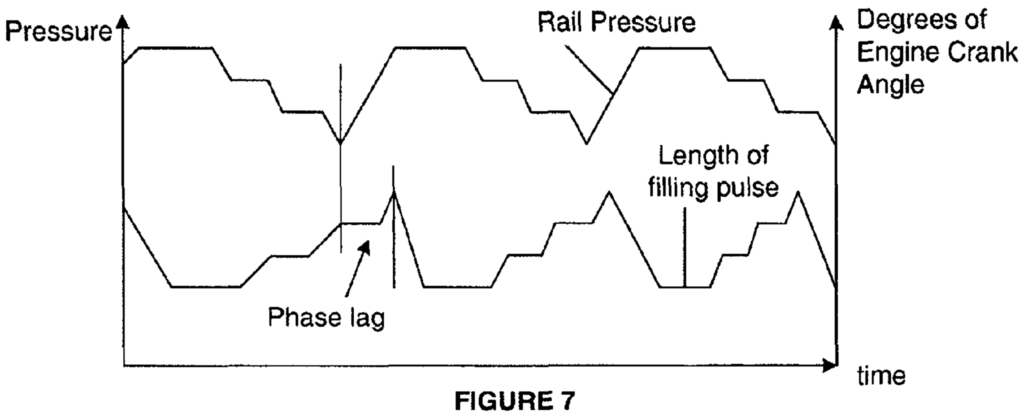
FIG. 7 is a still further graphical representation of rail pressure and filling pulse signal with respect to time following failure of a unit pump in the fuel injection system of FIG. 3*a;*

3) In the final scenario, the controller 22 is unable to fully compensate for the seized unit pump but does not reach its saturation point. In this case the rail pressure trace will assume the profile of the cam and the filling pulse signal will assume the mirror image of the cam profile. FIG. 7 shows a plot of rail pressure and filling pulse signal with respect to time in accordance with the data that is input into the detector 80 in this third scenario.

It is noted that FIGS. 5, 6 and 7 are simplified versions of the data that is actually received by the detector 80. The actual data received will contain an amount of noise that should be filtered first.

It is also noted that the data may more conveniently be analysed with respect to the engine crank angle rather than time as depicted. This is because the shape of the plots will remain unchanged with respect to engine angle as the engine conditions vary whereas the scaling of the plots will vary if plotted against time. By plotting the data with respect to engine angle the processing requirements on the detector 80 may be reduced.

The detector analyses the data received from the pressure sensor 32, controller 22, engine control unit 24 etc. and compares this against the profile expected from the cam arrangement. If the cam profile is detected within the measured current system parameters then the detector can deduce that a unit pump has failed.

The comparison may be achieved in a number of ways.

For example, the detector may comprise a pattern recognition algorithm which analyses the current system parameters against the known, i.e. predetermined, cam profile. The pattern recognition may be as simple as a curve fit between the current data and the predetermined data.

As an alternative, the detector 80 may perform a Fast Fourier Transform (FFT) of the current system parameters that are received at its inputs and compare the transformed components with the Fast Fourier Transform of the cam profile.

Since the cam profile is known and its frequency and phase components are related to the engine speed, the detector 80 will be able to deduce pump seizure from the FFT plots of the measured (i.e. current) system parameter(s) as no other phenomenon will give the same shape in the frequency domain.

It is noted that as an alternative to performing the FFT with respect to time, the FFT may be performed with respect to a synthetic "time" variable, e.g. engine angle.

Figure 8:
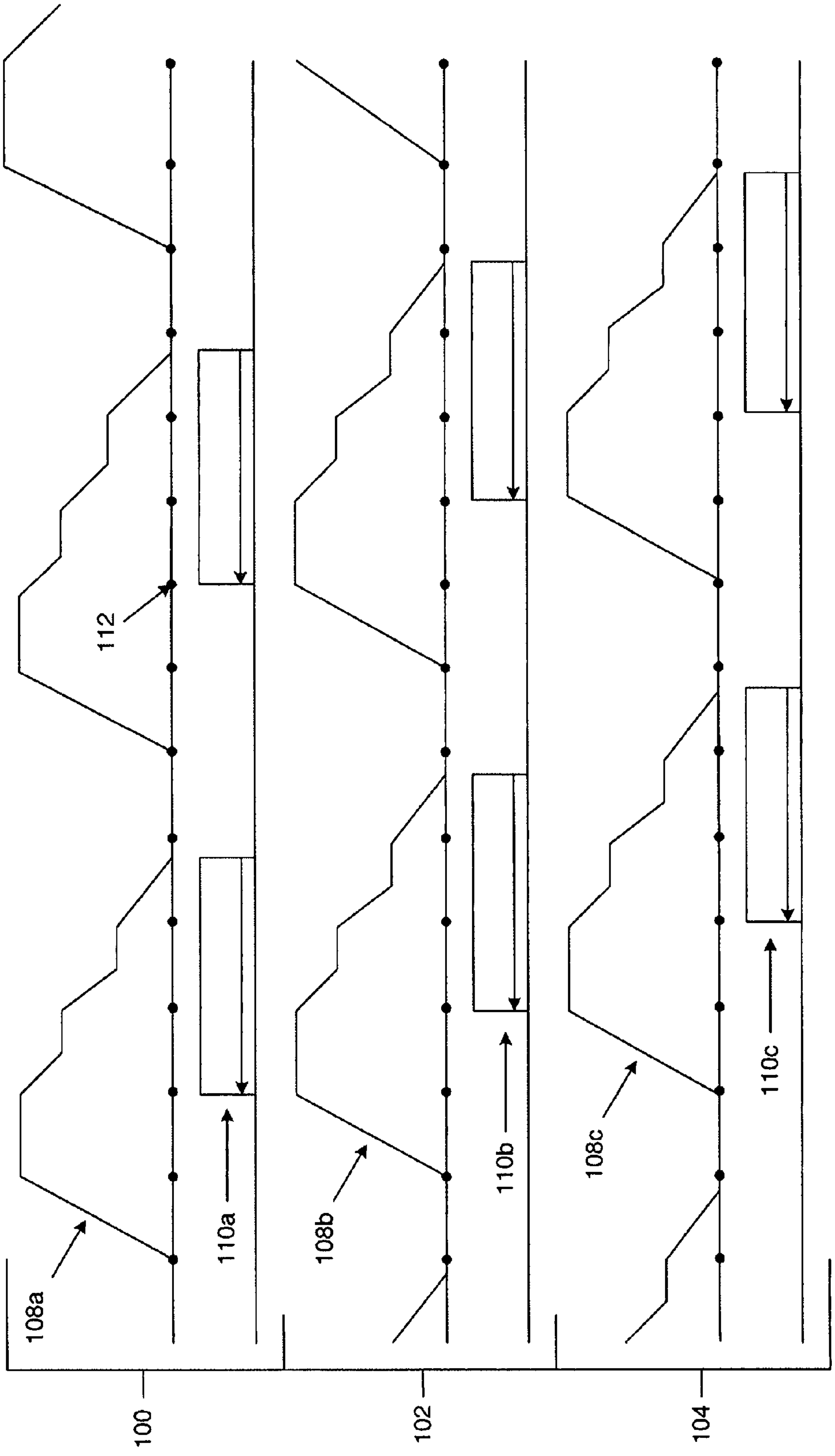
FIG. 8 shows the relationship between cam profile and filling pulse for three cylinders within an engine system.

FIG. 8 shows the relative phasing of the cam profile and filling pulses for 3 different engine cylinders (100, 102 and 104). It is noted that for the sake of clarity only three cylinders are shown in FIG. 8 but that the engine may comprise more cylinders than shown (a six cylinder engine is commonplace for example).

For each cylinder the cam profile (108*a*, 108*b*, 108*c*) is shown with respect to cam degrees (i.e. effectively with respect to time). The filling pulse (110*a*, 110*b*, 110*c*) applied to each cylinder is also shown.

Each mark 112 on the horizontal axis of the cam profile traces (108*a*, 108*b* and 108*c*) is equivalent to 60 cam degrees.

It is noted that the filling pulse can be as small as 0 degrees or large enough to coincide with the entire falling part of the lobe (which as noted above is around 150 cam degrees).

It can be seen that the cam profiles of the cylinders 100, 102, 104 are phased with respect to one another. The cam profile for cylinder 102 begins its upward stroke 60 cam degrees after the cam profile for cylinder 100. Similarly, the cam profile for cylinder 104 lags 60 cam degrees behind the cam profile for cylinder 102.

The filling pulses for the three cylinders are also phased in the same manner as the cam profiles.

It is noted that the end of the filling pulse coincides with the end of the cam profile, i.e. when the unit pump plunger has completed its retraction. When the filling pulse is complete the pump is reconnected to the rail. At the point of reconnection the pump has a transfer pressure of around 3 bar and the rail has a pressure of several hundred bar. As a result a substantial pressure wave travels from the rail into the pump on reconnection. The end of the filling pulse is arranged to finish as the plunger completes its retraction in order to minimise the pressure wave that is created. This helps to extend the operational life of the unit pump.

Figure 9:
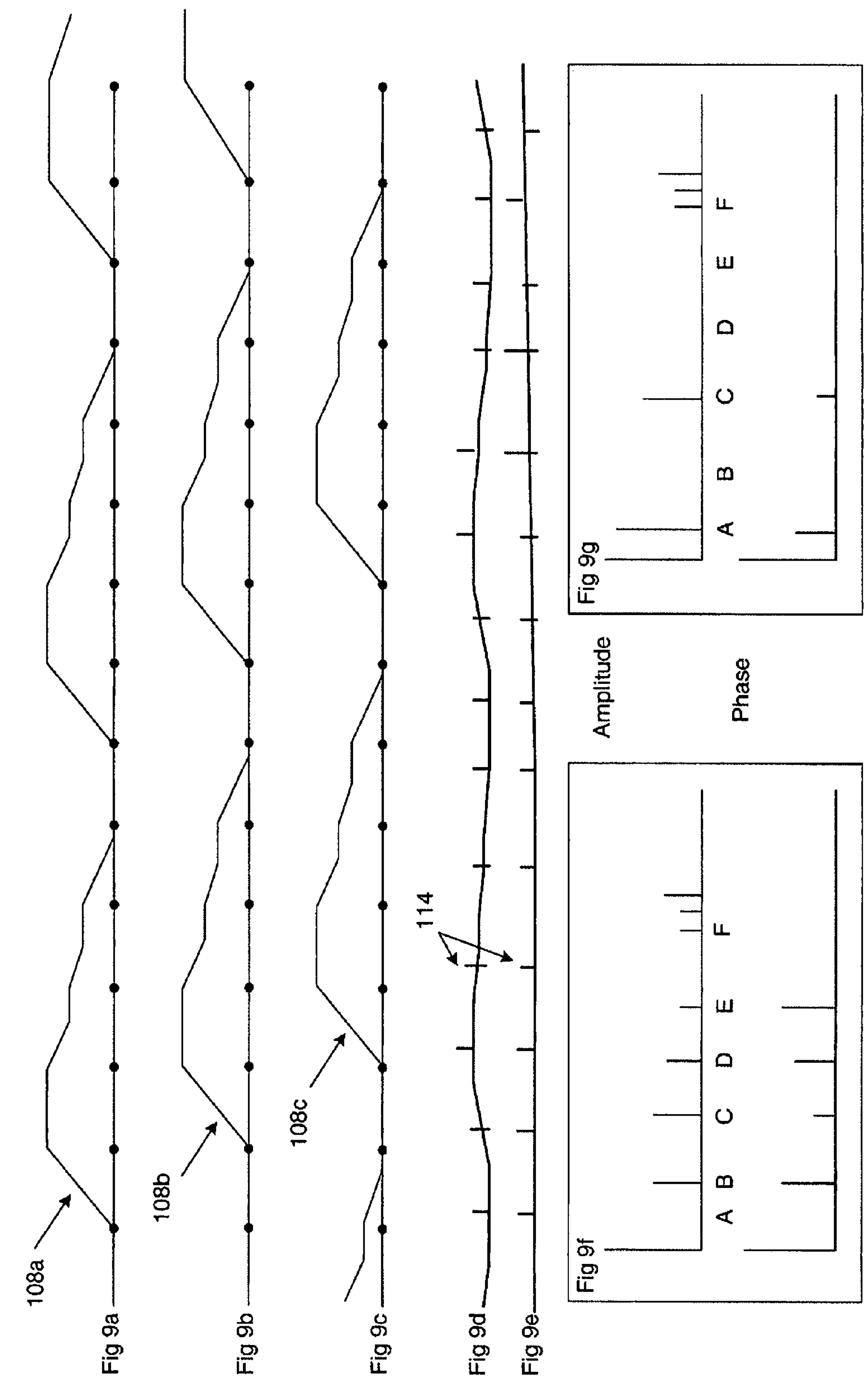
FIGS. 9*a* to 9*g* show the three cam profiles of FIG. 8, the rail pressure within the engine system for two different engine scenarios and the fast Fourier transform of the rail pressure traces associated with those engine scenarios.

FIG. 9 variously shows three cam profiles (FIGS. 9*a*, 9*b* and 9*c*), the rail pressure within the system for two different scenarios (FIGS. 9*d* and 9*e*) and the fast Fourier transform of the rail pressure traces of graphs 4 and 5 (FIGS. 9*f* and 9*g*).

It is noted that FIGS. 9*a*, 9*b* and 9*c* correspond to the cam profiles shown in FIG. 8 (and like reference numerals have therefore been used to denote like features).

FIG. 9*d* shows the rail pressure measured in the rail with a unit pump seizure in the second cylinder. FIG. 9*f* is the corresponding fast Fourier transform of this rail pressure trace. FIG. 9*f* shows the amplitude versus frequency and phase versus frequency of the FFT of the rail pressure trace.

FIG. 9*e* shows the rail pressure as measured in the rail in a system where the rail pressure is initially at a constant level before beginning to rise (In the example shown the rail pressure rises from midway through the FIG. 9*e*). All the unit pumps/plungers in this case are operating normally. The increased rail pressure may be a result of a blocked injector or a scheduled pressure increase by the engine management unit.

It is noted that FIGS. 9*d* and 9*e* show pressure spikes 114 that are engine synchronous. These could result from injection related disturbance. However, as described below, the FFT analysis will discriminate between these and a unit pump seizure. [It is noted that the pressure spikes 114 will occur at regular, evenly spaced intervals. Any variations in FIG. 9*e* from such intervals are merely an artifact of the drawing and should be ignored].

Referring to FIG. 9*d* it can be seen that the shape of the cam profile is present in the rail pressure signal. It is further noted that this superposed cam profile is in phase with the cam profile of the second cylinder (FIG. 9*b*). The detector, therefore, may firstly determine that a unit pump has a seized plunger by the fact that the cam profile is present within the rail pressure trace and may secondly determine that the second cylinder has a seized plunger because the phase of the cam shape present in the rail pressure signal coincides with the cam profile of the second cylinder 102.

As noted above, the detector 80 will be able to deduce unit pump seizure from the FFT plots of the measured (i.e. current) system parameter(s).

The results of the FFT of the rail pressure traces shown in FIGS. 9*d* and 9*e* is shown in FIGS. 9*f* and 9*g* respectively.

For the purposes of this explanation it is assumed that the cam profile, when transformed by the FFT, comprises two frequency components. In practice, there are likely to be more frequency components present. It is noted that any other noise, that is not synchronous with the engine, will not appear in the FFT provided the number of samples passed to the detector is sufficiently large.

FIG. 9*f* is the FFT of FIG. 9*d*. The frequency component at frequency B is the frequency of rotation of the cam. The fundamental frequency of the cam lobe is frequency B and since the cam profile is present in the rail pressure trace of FIG. 9*d*, then a frequency component at frequency B is present in FIG. 9*f*.

The frequency component at frequency C corresponds to 6 times the cam frequency. This is present on FIG. 9*f* because it is the fundamental frequency of the injection spikes (pressure spikes 114) that happen once per injection cycle per cylinder.

The frequency components at frequencies D and E are other frequencies present on the cam profile.

The frequency components around frequency E are from other sources such as the resonant frequency of the rail and can be ignored by the detector.

The frequency components at frequencies B, D and E can be calculated from the cam profile and their presence in the FFT of the rail pressure trace is confirmation to the detector of a seized unit pump.

The phase value for the frequency component at frequency B implies the angle from the start of the FFT sampling window to the beginning of the cam profile. Since, the detector knows the relative phase between the frequency components at frequencies B, D and E, if it detects frequency components with the same relative phase then this can be used to confirm that a unit pump seizure has occurred.

FIG. 9*g* is the FFT of FIG. 9*e* and it can be seen that this rail pressure signal does not have frequency components at frequencies B, D or E. The injection spike related frequency component at frequency C is present in FIG. 9*g* as are the high frequency components from other sources (frequency F). However, the lack of frequency components at frequencies B, D and E indicates that there is no seizure in this case.

It is noted that even if frequency components at frequencies B, D and E were present this may not necessarily indicate a unit pump seizure. For instance, if the frequency components at B, D and E were present but the relative phase information did not match with any of the cam lobes or if the relative amplitude was not characteristic of the cam profile then this would also indicate that there was no seizure.

The frequency component at frequency A results from the gradual increase in pressure noted above. There are also frequency components associated with injection but these can be ignored.

The detector according to the present invention compares measured system parameters against predetermined system parameters in order to identify whether the unit pumps are operating correctly. By sampling the displacement of the cam with respect to angle (or time) it is possible to decompose it into its constituent sine waves. In an oversimplified example, the cam profile in the angle domain may be represented by four different sine waves of specific amplitudes and phases. This analysis can be performed "offline" and comprises the predetermined system parameter. When the engine is running, the rail pressure can be sampled in the same format as the stored, predetermined data and a FFT performed "online". The online FFT will have many sine waves that are unrelated to the cam but if there is a plunger seizure and the cam profile appears in the rail pressure signal then amongst the unrelated frequency components, the cam profile frequency components will be present with the same relative amplitudes and phases as calculated offline.

Figure 10:
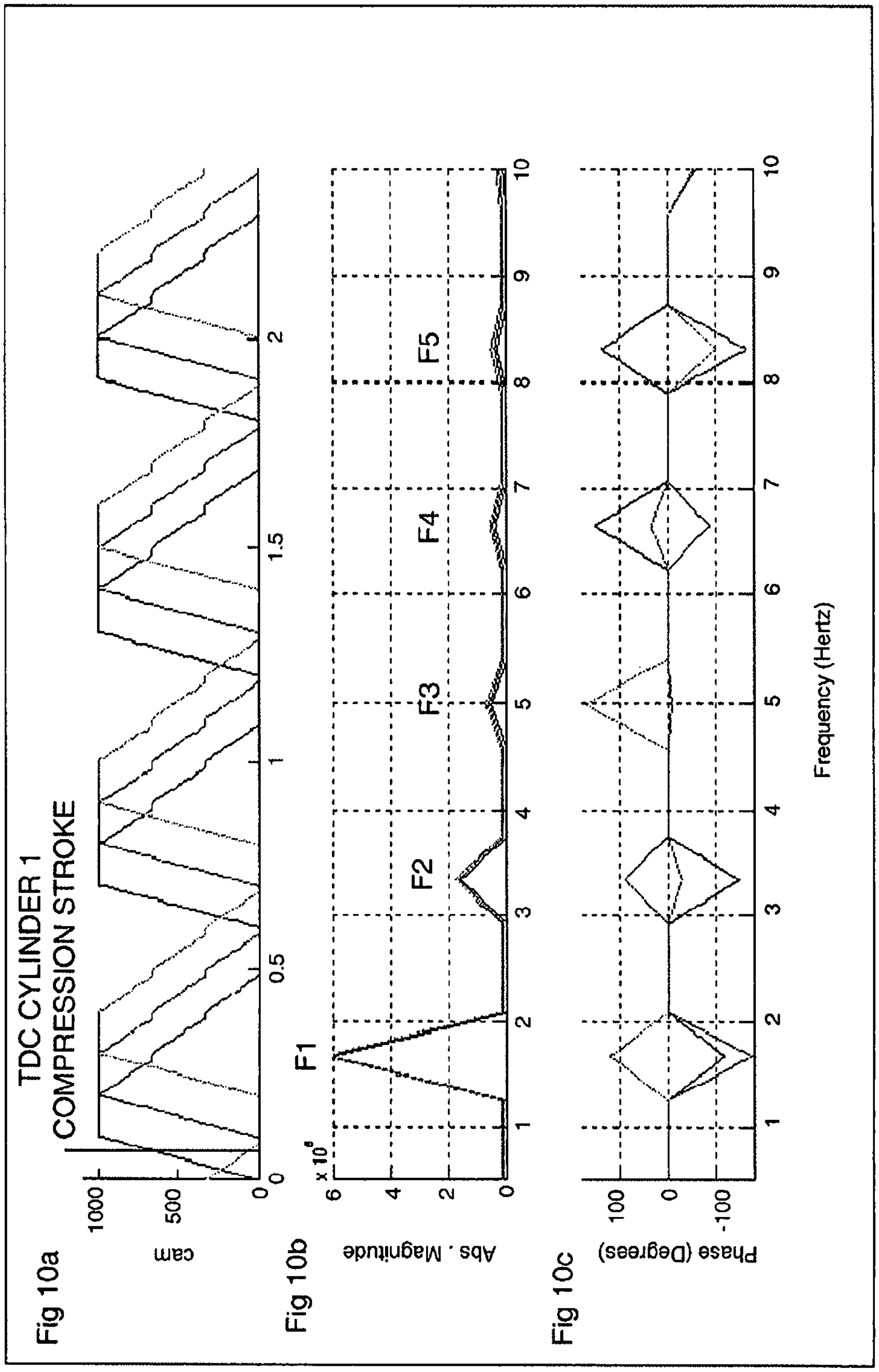
FIGS. 10*a* to 10*d* show a detailed example of the detection of plunger seizure in the fuel injection system of FIG. 3*a;*
Figure 10D:
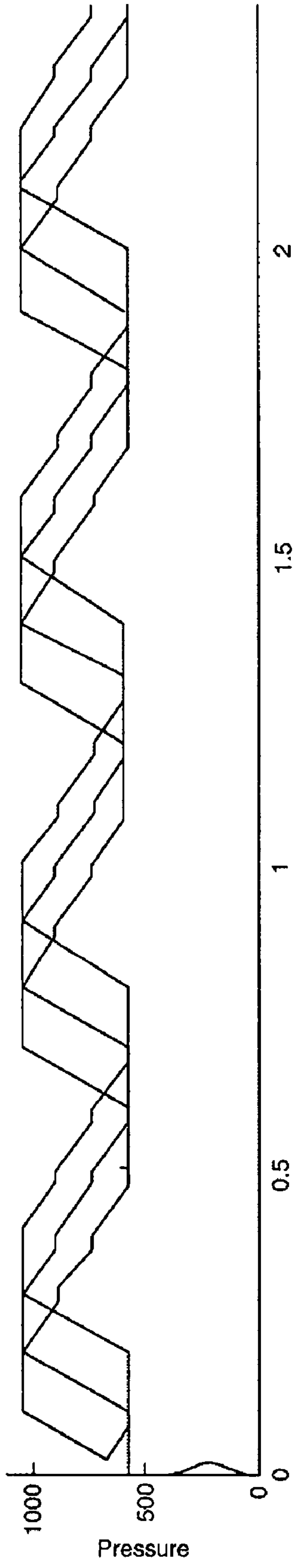

FIGS. 10*a* to 10*d* illustrate a specific example of how plunger seizure can be detected from the superposition of the drive motion of the cam arrangement onto the measured pressure signal. FIGS. 10*a*-10*d* comprise four graphs in which: FIG. 10*a* shows cam lift on lobes associated with pumps of three cylinders of an engine; FIG. 10*b* shows the frequency content of the waveforms of FIG. 10*a*; FIG. 10*c* shows phase information corresponding to the frequency content in FIG. 10*b*; and, FIG. 10*d* shows examples of modified pressure signals that would be recorded by a pressure sensor after failure of a pump plunger (It is noted that FIG. 10*d* shows three example traces and does not depict the pressure trace that would be recorded after any one particular pump seizure).

FIG. 10*a* shows the cam lift on lobes associated with the pumps of three cylinders of a six cylinder engine (Cam Lobe A, Cam Lobe B and Cam Lobe C). It is noted that only three cylinders are depicted in FIG. 10*a* in order to avoid reducing legibility of the illustration.

In FIG. 10*a*, the horizontal axis is time (in seconds) and it is noted that in a 2.4 second period there are 4 complete cam revolutions. Zero on the time axis coincides with a known position of the cam for example "Top Dead Centre for cylinder 1 on the compression stroke".

It is further noted that Cam Lobe A leads Cam Lobe B by 60 cam degrees. Cam Lobe B leads Cam Lobe C by 60 cam degrees. These cam lobes, Cam Lobe A, Cam Lobe B and Cam Lobe C, drive pumps, Pump A, Pump B, Pump C.

As previously described— i. if Pump A seizes, then a pressure disturbance proportional to the lift of the Cam Lobe A will be measured using the pressure sensor.

ii. if Pump B seizes, then a pressure disturbance proportional to the lift of the Cam Lobe B will be measured using the pressure sensor.

iii. If the Pump C seizes, then a pressure disturbance proportional to the lift of the Cam Lobe C will be measured using the pressure sensor.

FIG. 10*b* has three lines showing the frequency content of the waveforms Cam Lobe A, Cam Lobe B and Cam Lobe C and was derived by Fourier transforming the waveforms in FIG. 10*a*. It is noted that the horizontal axis of FIG. 10*b* is frequency whereas the horizontal axis of FIG. 10*a* is time. The vertical axis of FIG. 10*b* is proportional to the magnitude of the frequencies.

The frequency content of the waveforms for Cam Lobe A, Cam Lobe B and Cam Lobe C is identical. This is because the shape of the three signals is the same.

It is noted in FIG. 10*b* that there is a large peak in the frequency content at 1.66 Hz. Since the period of the waveforms is 600 ms, this 1.66 Hz frequency is the fundamental frequency of the waveforms.

FIG. 10*c* shows phase information corresponding to the frequency content information shown in FIG. 10*b*. For the sake of clarity, phase information corresponding to frequency content information that was not of a significant amplitude has not been determined and is not included in FIG. 10*c*.

It is noted that while the frequency content of the cam lobes A-C is identical (as shown by FIG. 10*b*), the phase information is not. This is because the phase of the frequency components of Cam Lobe A is a function of the phase difference between the start of the Cam Lobe A waveform in FIG. 10*a* and the origin of the graph.

Also, since there is a fixed relationship between the origin of the graph and the angular position of the cam with respect to a given engine position, for example, "Top Dead Centre, cylinder 1 compression stroke", the phase information of the frequency components can also be regarded as a function of the angular position of the cam lobe signal with respect to that given engine position. For example, in the "Top dead centre, cylinder 1, compression stroke" example, the phase information of the frequency components of Cam Lobe A is a function of the angular position of the Cam Lobe A signal w.r.t. T.D.C. Cylinder 1.

Thus from FIG. 10*c* it can be seen that the fundamental frequency of 1.66 Hz has a phase value of:

−120 degrees for Cam Lobe A
−180 degrees for Cam Lobe B
120 degrees for Cam Lobe C This is equivalent to:

240 degrees for Cam Lobe A
180 degrees for Cam Lobe B
120 degrees for Cam Lobe C It is therefore noted that by looking at the phase of the fundamental frequency of the waveforms for the cam lobes it can be confirmed that they are separated by 60 cam degrees.

In order to detect whether a pump has seized, the following procedure may be followed:

1) Prior to analysing the engine to ascertain whether there has been any pump seizures, graphs equivalent to FIG. 10 *a* to *c* are generated and stored for all cam lobes (6 for a 6 cylinder engine) based on a table of Cam Lift vs angle for the specific cam being used, at the current engine speed. This information corresponds to the predetermined system parameter information mentioned above.

2) The pressure signal is then sampled, starting at a point corresponding to the origin of FIG. 10*a*. This information corresponds to the current system parameter information mentioned above.

3) The sampled pressure signal is then processed with a Fourier transform to give frequency and phase information for the sampled signal. This information corresponds to the frequency/phase information contained in FIGS. 10*b* and 10*c* for the predetermined system parameter.

4) The frequency information for the predetermined and current system parameters are then compared. The phase information of the current system parameters relative to the phase of the fundamental frequency of the system is also compared to the predetermined system parameters. If (i) the frequencies at F1, F2, F3, F4 from FIG. 10*b* are present in the frequency information derived from the pressure measurements, and their relative amplitudes are the same as in FIG. 10*b*, and; (ii) the phase of frequencies (corresponding to F2, F3 and F4) in the current system parameters match the phase of F2, F3, and F4 relative to F1 then it can be concluded that one of the pumps has seized.

5) The phase information for the predetermined and current system parameters are then compared. By comparing the phase information for the measured phase information with the predetermined phase information it can be determined which pump has seized. If the measured phase information corresponding to the fundamental frequency (the speed of engine rotation) is the same as the phase information for one of the cam lobes in FIG. 10*c* then it can then be determined which pump has seized.

It is noted that the system and above procedure may be further improved by adding the measured effects of the fuel injection on the pressure waveform to the calculated FIG. 10*a* in step 1 above.

As previously noted, the comparison of the system parameters that is carried out by the processing means may conveniently be with respect to time (as is the case for FIG. 10 described above). However, the comparison may also be carried out with respect to engine crank angle. If the processing is performed with respect to time then the data will be affected by changes in the engine operating conditions. If the processing is performed with respect to engine angle then the data processing requirements may be reduced.

As a further alternative, the detector 80 may monitor changes in the transfer function of the fuel system. The seizure of one of the unit pumps will cause the transfer function of the system to alter. This change can be modelled as a disturbance signal that is proportional to the cam profile acting on the nominal transfer function of the system.

The unit-pump 6 and the common rail 4 together constitute a dynamic pump/rail system 40 which is initially modelled prior to engine installation in order to derive a mathematical model defining the variables that describe the state of the system as a function of time. Such a mathematical model is referred to as a 'transfer function' and would be well known to the skilled reader. The transfer function is used to calculate the P, I and D controller parameters prior to engine installation such that the pump/rail system 40 is controlled acceptably when the engine is operated for the first time.

In the embodiment described, the controller 22 is a three-term controller having a proportional gain value 'P', an integral gain value 'I' and a derivative gain value 'D'. Such a three-term controller is typically referred to as a 'PID' controller and its functionality would be familiar to the skilled reader.

Figure 11:
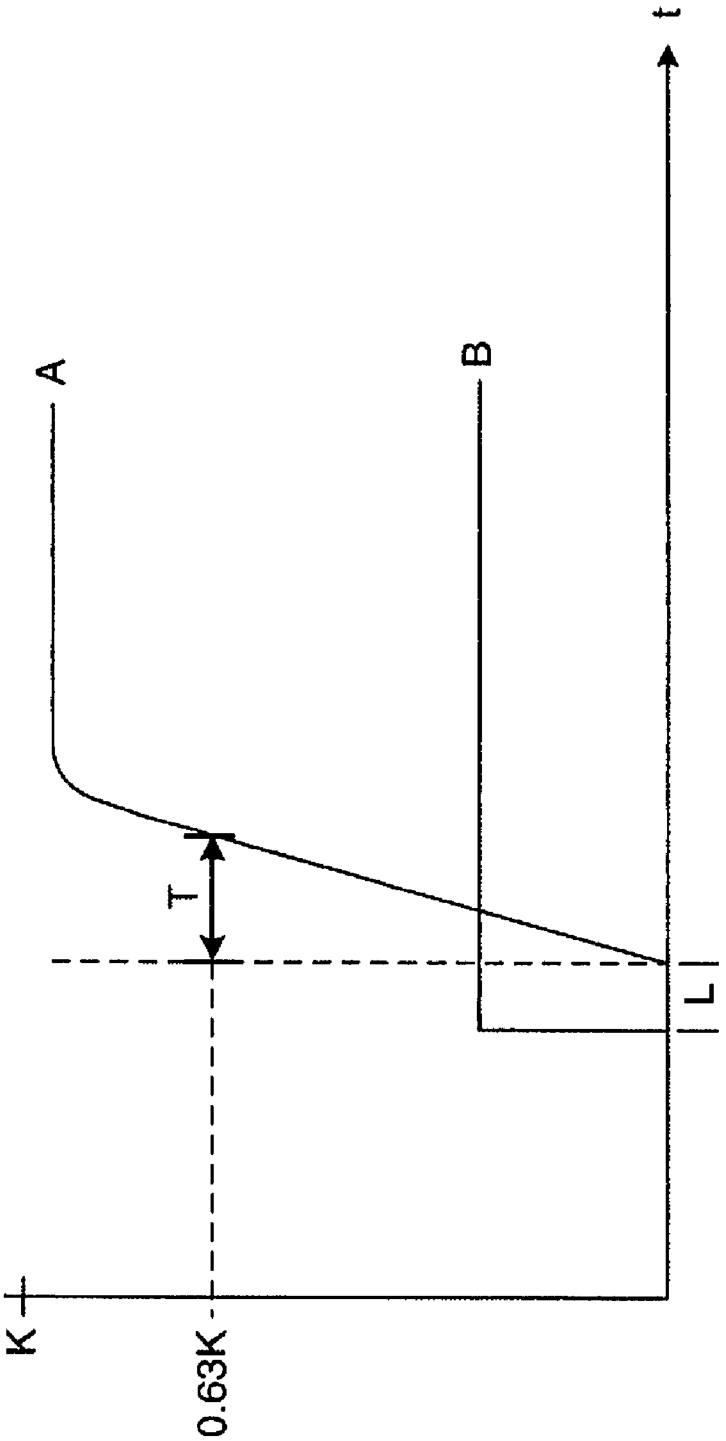
FIG. 11 is a graphical representation of the output of a first order transfer function in response to a step change input.

In this embodiment, the transfer function of the pump/rail system is a delayed first order function having three specific parameters that define the characteristic response of the system to an input: a steady state gain value 'K'; a time constant value 'T'; and a lag time value 'L'. By way of explanation, the response of a characteristic first order system is shown in FIG. 11, where the output (actual rail pressure 'A') responds to a step-change in the input (filling pulse) 'B'. The steady state gain K is the ratio of the actual rail pressure A at steady state conditions to the filling pulse input B. The time constant T is the time taken for the actual rail pressure to reach 63% of the demanded rail pressure following a step change in demanded rail pressure. The lag time L is the time period between the start of the step change input and the start of the rise in common rail pressure.

Referring once again to FIG. 2, although the characteristic parameters of the pump/rail system 40 are initially modelled prior to engine installation, the invention provides an online system identification means in the form of a system identification module 42 and a controller parameter calculation means in the form of a controller parameter calculation module 44 (hereinafter 'calculation module') for modifying the parameters of the controller 22 online in order to compensate for changes in the response characteristics of the pump/rail system 40.

The system identification module 42 is implemented online, that is to say during normal operation of the engine, continuously at predetermined periods in synchronisation with a pseudo random binary input sequence of filling pulses (hereafter 'PRBS') that is input to the pump/rail system 40 by the controller 24. The skilled reader will be familiar with the principles of applying a pseudo random binary sequence as an input signal to a system so further explanation is omitted here.

In order to calculate the characteristic parameters of the pump/rail system 40, the system identification module 42 monitors the PRBS signal that is input to the unit-pump 6 and the actual rail pressure that is measured by the rail pressure sensor 32. Since the PRBS input signal comprises a set of known input stimuli, the system identification module 42 compares the response of the actual common rail fuel pressure to the known stimuli and calculates revised characteristic parameters of K, T and L for the pump/rail system 40.

The system identification module 42 communicates electronically with the controller parameter calculation module 44 which, in turn, communicates with the controller 22. The calculation module 44 receives the revised system parameter values K, T and L from the system identification module 42 and calculates new P, I and D values for the controller 22.

In addition to communicating with the calculation module 44, the system identification module 42 also transmits the new characteristic parameter values K, T and L to the detector 80 shown in FIG. 4.

The detector 80 monitors the incoming flow of data from the system identification module 42, namely the characteristic parameters K, T, and L, and performs calculations in order to identify certain phenomena associated with the system. The embodiment of the invention described herein is particularly concerned with the identification of unit pump failure, e.g. by the seizure of the pump plunger. The detection of the aforesaid phenomenon is discussed below with reference to FIG. 11

Figure 12:
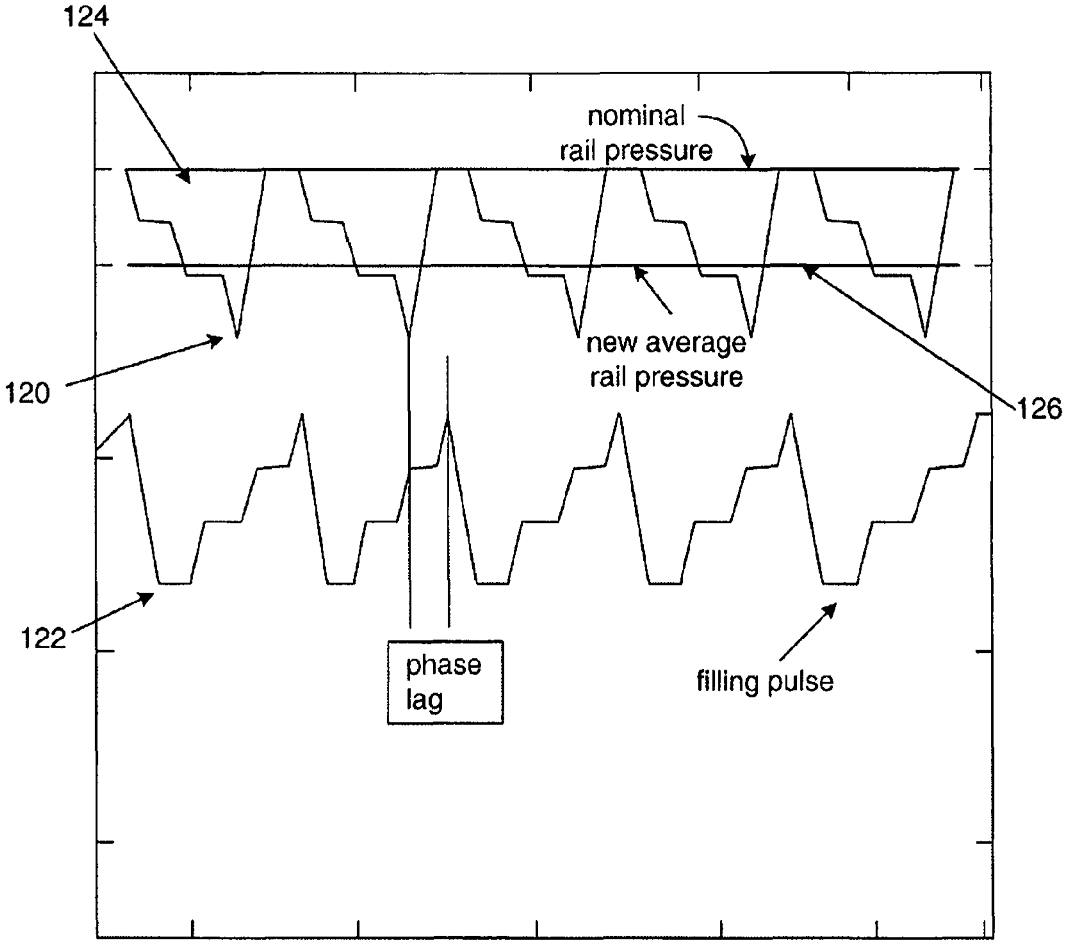
FIG. 12 is a graph illustrating the effect of a unit pump failure on the transfer function of a system.

FIG. 12 shows a plot of rail pressure 120 and filling pulse 122 with respect to time for a general case of unit pump seizure (i.e. the controller 22 is unable to fully compensate for the seized unit pump but does not reach its saturation point—see also FIG. 7 above). The nominal rail pressure 124 under normal operating conditions (all unit pumps operating normally) is also shown in FIG. 11 as the horizontal line at the top of the Figure.

Assuming for simplicity that only one unit pump (in an engine comprising 6 unit pumps) has seized, then the resultant average pressure will be less than the nominal pressure since one of the injectors will not be filling. The new average rail pressure is shown as horizontal line 126. The new gain K of the transfer function of the system will now be a corresponding proportion of its original value.

There will also be a phase lag between the filling pulse 122 and rail pressure 120 signals. When one of the unit pumps is seized then the lag will either be 60 cam degrees (if the change in demand occurs before a working pump) or it will be 120 cam degrees (if the change occurs before a broken pump). There will therefore be an average lag of (60×5+120)/6=70 cam degrees.

It is noted that the above detection methods (pattern recognition, FFT and transfer function analysis) will be most effective when the pressure demand is a constant and other relevant engine operating conditions are also a constant (e.g. injected fuel quantity, engine speed, fuel temperature).

However, detection of a pump seizure will also be possible during periods when the fuel system is experiencing varying conditions.

In the case of a detector utilising a pattern recognition algorithm, the pattern produced by the cam will be different in form to any other disturbance present in the rail pressure or the filling pulse. It will therefore be possible to distinguish such a pattern even when temperature, rail pressure demand and injected fuel quantity vary. The detector 80 may additionally compensate for the effects of changing rail pressure demand since its effects on the 'the pressure error signal' 38 are predictable.

In the case of a detector that analyses the data received by utilising a FFT module, transient operating conditions will produce extra frequency components of the FFT of the rail pressure and filling pulse signals. Some of these extra components may coincide with those components that indicate a pump seizure. However, if the FFT processes signals against engine angle, rather than time, in order to produce transformed results in terms of a synthetic variable rather than frequency, then this would mitigate the effects of the varying operating conditions.

In the case of a detector that analyses the transfer function of the system the effects of varying temperature, engine speed and injected fuel quantity may be compensated for because the effects of such variables on the gain of the system is known.

It will be understood by those who practice the invention and those skilled in the art, that various modifications and improvements may be made to the invention without departing from the scope of the invention, as defined by the claims.

For example, although the above description has been presented with reference to a constant volume fuel system it is not a necessary feature of the present invention that the fuel system should have a constant volume. If the volume of the system varies in a known or predictable manner then the detector will be able to compensate for these underlying variations and analyse the measured system parameters for a predetermined system parameter.

It should be appreciated that the fuel injection system 2 provides a context for the operation of the invention but is not intended to limit the scope of the claims. Alternatively, for example, the common rail 4 may be supplied with high pressure fuel by an equivalent pumping means, a radial high pressure fuel pump for instance.

It should also be appreciated that although the common rail 4 is described as supplying high pressure fuel injectors 8, typically such an engine may include six, eight or then fuel injectors.

The invention claimed is:

1. A detector for detecting the operational status of one or more of a plurality of fuel pumps in a fuel system of a vehicle, the system comprising an accumulator volume for storing high pressure fuel, one or more injectors arranged in fluid communication with the accumulator volume and a plurality of high pressure fuel pumps arranged in fluid communication with the accumulator volume so as to supply high pressure fuel thereto, the operation of the fuel pumps being controlled by a filling pulse signal from a control means, the detector comprising inputs for receiving data representing at least one current system parameter processing means arranged to compare the at least one current system parameter against one or more predetermined system parameters in order to identify the operational status of the fuel pumps wherein each fuel pump comprises a pumping chamber within which fuel is pressurised by an associated pumping plunger, the pumping plunger being driven by a cam drive arrangement and the drive motion imparted to the pumping plunger by the cam drive arrangement being a characteristic of the system wherein the processing means compares the at least one current system parameter with the drive motion of the cam drive arrangement, the presence of the drive motion superposed onto the current system parameter indicating a reduction in the operational status of one or more of the fuel pumps, and;

wherein the drive motion applied to a first fuel pump is phased in relation to the drive motion being applied to neighbouring fuel pumps wherein the processing means compares the current system parameter with the drive motion as applied to the plurality of fuel pumps in order to determine the operational status of each fuel pump.

2. A detector for detecting the operational status of one or more fuel pumps in a fuel system of a vehicle, the system comprising an accumulator volume for storing high pressure fuel, one or more injectors arranged in fluid communication with the accumulator volume and one or more high pressure fuel pumps arranged in fluid communication with the accumulator volume so as to supply high pressure fuel thereto, the operation of the one or more fuel pumps being controlled by a filling pulse signal from a control means, the detector comprising inputs for receiving data representing at least one current system parameter processing means arranged to compare the at least one current system parameter against one or more predetermined system parameters in order to identify the operational status of the one or more fuel pumps wherein the processing means comprises fast Fourier transform means, the processing means being arranged to transform the at least one current system parameter and the one or more predetermined system parameters and to compare the transformed components wherein the transform components comprise frequency content information and the processing means is arranged to determine if there is a fault in the fuel system by comparing the frequency content information of the current system parameter to the frequency content information of the predetermined system parameter wherein the transform components further comprise phase information and the processing means is arranged to identify the location of the a fault by comparing the phase information of the current system parameters with the phase information of the predetermined system parameter.

3. A detector for detecting the operational status of one or more fuel pumps in a fuel system of a vehicle, the system comprising an accumulator volume for storing high pressure fuel, one or more injectors arranged in fluid communication with the accumulator volume and one or more high pressure fuel pumps arranged in fluid communication with the accumulator volume so as to supply high pressure fuel thereto, the operation of the one or more fuel pumps being controlled by a filling pulse signal from a control means, the detector comprising inputs for receiving data representing at least one current system parameter processing means arranged to compare the at least one current system parameter against one or more predetermined system parameters in order to identify the operational status of the one or more fuel pumps wherein (a) each fuel pump comprises a pumping chamber within which fuel is pressurised by an associated pumping plunger, the pumping plunger being driven by a cam drive arrangement and the drive motion imparted to the pumping plunger by the cam drive arrangement being a characteristic of the system (b) the processing means comprises fast Fourier transform means, the processing means being arranged to transform the at least one current system parameter and the one or more predetermined system parameters and to compare the transformed components (c) the processing means compares transform components of the at least one current system parameter with transform components of the drive motion imparted by the cam drive arrangement to the plunger (d) the processing means is arranged to:

(i) measure a current system parameter and obtain a Fourier transform of the measured current system parameter, the Fourier transform comprising frequency content and phase information of the measured current system parameter;

(ii) compare the Fourier transform of the measured current system parameter with predetermined Fourier transform information relating to the drive motion of the cam arrangement at each fuel pump, the predetermined Fourier transform information comprising frequency content information of the drive motion of the cam arrangement and phase information corresponding to the frequency content information (iii) determine if a pump has seized in the event that the current system parameter frequency content information matches or substantially matches the predetermined Fourier transform frequency content information and the phase information of the current system parameter frequency content information relative to a fundamental frequency component within the frequency content information matches or substantially matches the phase of the predetermined Fourier transform phase information;

(iv) determine which pump has seized by comparing the phase information of a fundamental frequency component within the frequency content information for the predetermined and current transform information.

4. A detector for detecting the operational status of one or more fuel pumps in a fuel system of a vehicle, the system comprising an accumulator volume for storing high pressure fuel, one or more injectors arranged in fluid communication with the accumulator volume and one or more high pressure fuel pumps arranged in fluid communication with the accumulator volume so as to supply high pressure fuel thereto, the operation of the one or more fuel pumps being controlled by a filling pulse signal from a control means, the detector comprising;

inputs for receiving data representing at least one current system parameter, and processing means arranged to compare the at least one current system parameter against one or more predetermined system parameters in order to identify the operational status of the one or more fuel pumps.

5. A detector as claimed in claim 4, wherein the one or more predetermined system parameters correspond to data representing one or more faulty fuel system components.

6. A detector as claimed in claim 4, wherein the at least one current system parameter is the pressure within the accumulator volume.

7. A detector as claimed in claim 4, wherein the at least one current system parameter is the filling pulse signal.

8. A detector as claimed in claim 4, wherein the data received by the inputs relates to the pressure within the accumulator volume and the filling pulse signal.

9. A detector as claimed in claim 4, wherein each fuel pump comprises a pumping chamber within which fuel is pressurised by an associated pumping plunger, the pumping plunger being driven by a cam drive arrangement and the drive motion imparted to the pumping plunger by the cam drive arrangement being a characteristic of the system wherein the processing means compares the at least one current system parameter with the drive motion of the cam drive arrangement, the presence of the drive motion superposed onto the current system parameter indicating a reduction in the operational status of one or more of the fuel pumps.

10. A detector as claimed in claim 9, wherein the fuel system comprises a plurality of fuel pumps, each pump being driven by the cam arrangement, the drive motion applied to a first fuel pump being phased in relation to the drive motion being applied to neighbouring fuel pumps wherein the processing means compares the current system parameter with the drive motion as applied to the plurality of fuel pumps in order to determine the operational status of each fuel pump.

11. A detector as claimed in claim 4, wherein the processing means is arranged to analyse the data received by the inputs with respect to time.

12. A detector as claimed in claim 4, wherein the processing means is arranged to analyse the data received by the inputs with respect to engine crank angle.

13. A detector as claimed in claim 4, wherein the processing means comprises pattern recognition means, the processing means being arranged to compare the at least one current system parameter with the one or more predetermined system parameters using the pattern recognition means.

14. A detector as claimed in claim 4, wherein the processing means comprises fast Fourier transform means, the processing means being arranged to transform the at least one current system parameter and the one or more predetermined system parameters and to compare the transformed components.

15. A detector as claimed in claim 14, wherein the transform is with respect to time.

16. A detector as claimed in claim 14, wherein the transform is with respect to engine crank angle.

17. A detector as claimed in claim 14, wherein a) each fuel pump comprises a pumping chamber within which fuel is pressurised by an associated pumping plunger, the pumping plunger being driven by a cam drive arrangement and the drive motion imparted to the pumping plunger by the cam drive arrangement being a characteristic of the system wherein the processing means compares the at least one current system parameter with the drive motion of the cam drive arrangement, the presence of the drive motion superposed onto the current system parameter indicating a reduction in the operational status of one or more of the fuel pumps;

b) the processing means compares transform components of the at least one current system parameter with transform components of the drive motion imparted by the cam drive arrangement to the plunger.

18. A detector as claimed in claim 17, wherein the processing means is arranged to:

(i) measure a current system parameter and obtain a Fourier transform of the measured current system parameter, the Fourier transform comprising frequency content and phase information of the measured current system parameter;

(ii) compare the Fourier transform of the measured current system parameter with predetermined Fourier transform information relating to the drive motion of the cam arrangement at each fuel pump, the predetermined Fourier transform information comprising frequency content information of the drive motion of the cam arrangement and phase information corresponding to the frequency content information (iii) determine if a pump has seized in the event that the current system parameter frequency content information matches or substantially matches the predetermined Fourier transform frequency content information and the phase information of the current system parameter frequency content information relative to a fundamental frequency component within the frequency content information matches or substantially matches the phase of the predetermined Fourier transform phase information;

(iv) determine which pump has seized by comparing the phase information of a fundamental frequency component within the frequency content information for the predetermined and current transform information.

19. A detector as claimed in claim 14, wherein the transform components comprise frequency content information and the processing means is arranged to determine if there is a fault in the fuel system by comparing the frequency content information of the current system parameter to the frequency content information of the predetermined system parameter.

20. A detector as claimed in claim 19, wherein the transform components further comprise phase information and the processing means is arranged to identify the location of the a fault by comparing the phase information of the current system parameters with the phase information of the predetermined system parameter.

21. A detector as claimed in claim 4, wherein the one or more predetermined system parameters include one or more of i) a proportional gain value (P), ii) an integral gain value (I) and iii) a derivative gain value (D).

22. A detector as claimed in claim 4, wherein the one or more predetermined system parameters include one or more of i) a steady state gain value (K), ii) a system time constant value (T) and iii) a system time lag value (L).

23. A detector as claimed in claim 4, further comprising storage means for storing predetermined system parameters.

24. A detector as claimed in claim 23, wherein the storage means stores the one or more predetermined parameters for varying engine conditions.

25. A detector as claimed in claim 23, wherein the storage means comprises a look up table for storing the one or more predetermined system parameters.

26. A detector as claimed in claim 4, further comprising output means for outputting a response signal as determined by the processing means.

27. A detector as claimed in claim 26, wherein the response signal comprises a notification signal which is output to indicator means for alerting a user as to the operational status of the fuel pumps.

28. A vehicle comprising an internal combustion engine, an accumulator volume for storing high pressure fuel, one or more injectors arranged in fluid communication with the accumulator volume and one or more high pressure fuel pumps arranged in fluid communication with the accumulator volume so as to supply high pressure fuel thereto, the operation of the one or more fuel pumps being controlled by a filling pulse signal from a control means and a detector as claimed in claim 4.

29. A vehicle as claimed in claim 28, wherein in the event of failure of one or more fuel pumps, the detector outputs a response signal, the response signal comprising an engine control signal to limit the speed of the vehicle.

30. A control unit for controlling a high pressure fuel pump so as to control the volume of fuel that is supplied to an accumulator volume comprising a detector as claimed in claim 4.

31. An engine control unit comprising a detector as claimed in claim 4.

32. A fuel system comprising an accumulator volume for storing high pressure fuel, one or more injectors arranged in fluid communication with the accumulator volume and one or more high pressure fuel pumps arranged in fluid communication with the accumulator volume so as to supply high pressure fuel thereto, the operation of the one or more fuel pumps being controlled by a filling pulse signal from a control means and a detector as claimed in claim 4.

33. A method of detecting the operational status of one or more fuel pumps in a fuel system of a vehicle, the system comprising an accumulator volume for storing high pressure fuel, one or more injectors arranged in fluid communication with the accumulator volume and one or more high pressure fuel pumps arranged in fluid communication with the accumulator volume so as to supply high pressure fuel thereto, the operation of the one or more fuel pumps being controlled by a filling pulse signal from a control means, the method comprising receiving data representing at least one current system parameter comparing the at least one current system parameter against one or more predetermined system parameters in order to identify the operational status of the one or more fuel pumps.

34. A data carrier comprising a computer program arranged to configure a detector to implement the method according to claim 33.

* * * * *